Sept. 28, 1954 E. E. HESTON Re. 23,880

EXTRUDER

Original Filed March 7, 1950

INVENTOR.
EUGENE E. HESTON
BY
Oberlin & Limbach
ATTORNEYS.

Reissued Sept. 28, 1954 Re. 23,880

UNITED STATES PATENT OFFICE 23,880

EXTRUDER

Eugene E. Heston, Akron, Ohio, assignor to National Rubber Machinery Company, Akron, Ohio, a corporation of Ohio Original No. 2,595,455, dated May 6, 1952, Serial No. 148,235, March 7, 1950. Application for reissue February 8, 1954, Serial No. 409,014

8 Claims. (Cl. 18—12)

Matter enclosed in heavy brackets [ ] appears in the original patent but forms no part of this reissue specification; matter printed in italics indicates the additions made by reissue.

The present invention, while relating generally as indicated to an extruder, is more particularly concerned with certain improvements in a screw-type extruder for thermoplastic and like material which render the same more efficient in operation to produce a superior extruded product, and which in some instances render possible the extrusion of materials with which difficulty has been heretofore experienced.

Screw-type extruders of the type currently in use are usually provided with a strainer or breaker plate assembly between the extrusion end of the feed screw and the die to hold back unplasticized particles of material as well as other foreign matter, such plate also functioning to build up back pressure on the material to promote frictional heating, mixing, and smearing of the material. It has also been proposed heretofore in the extrusion of certain materials such as vinylidene chloride, for example, to omit the strainer plate assembly and in lieu thereof to mount the feed screw for longitudinal adjustment in the cylinder and to form the screw with a tapered end portion for cooperation with a conical bore located adjacent to the die orifice and in this way to effect a desired control of the rate of flow of material. As in the other example, there is created an increased back pressure on the material which surrounds the screw. An extruder of the last-mentioned type is disclosed in the Allen L. Heston Patent No. 2,449,652, dated September 21, 1948.

One object of this invention is to provide an extruder in which, contrary to the prior extruders aforesaid, the required back pressure on the material is built up in the early stages of the extruding process to effect a more efficient heating, mixing, and smearing of the material.

Another object of this invention is to provide an extruder which has novel means therein for effecting de-volatilization of the material and removal of trapped air bubbles therefrom during the course of the travel of the material through the extruder.

Another object of this invention is to provide an extruder in which there is included a narrow annular orifice defined between relatively rotating parts of the extruder and disposed ahead of the extrusion die orifice, the material which is forced through such annular orifice being subjected to a grinding or smearing action to thereby effect a uniform and thorough dispersion or blending of the material.

Another object of this invention is to provide an extruder in which the aforesaid annular orifice is adjustable to enable variation of the grinding action in accordance with the properties of the material being extruded.

Another object of this invention is to provide an extruder which has therein a tempering or low pressure zone through which the devolatilized material passes prior to extrusion to transform the material to an ideal condition for extrusion and to relieve the pulsation or uneven flow of the material as is occasionally encountered in prior art extruders wherein there is choking of the material at the extrusion end and sudden releasing of the pressure on the material just prior to the point of extrusion.

Other objects and advantages of the present invention will become apparent as the following description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
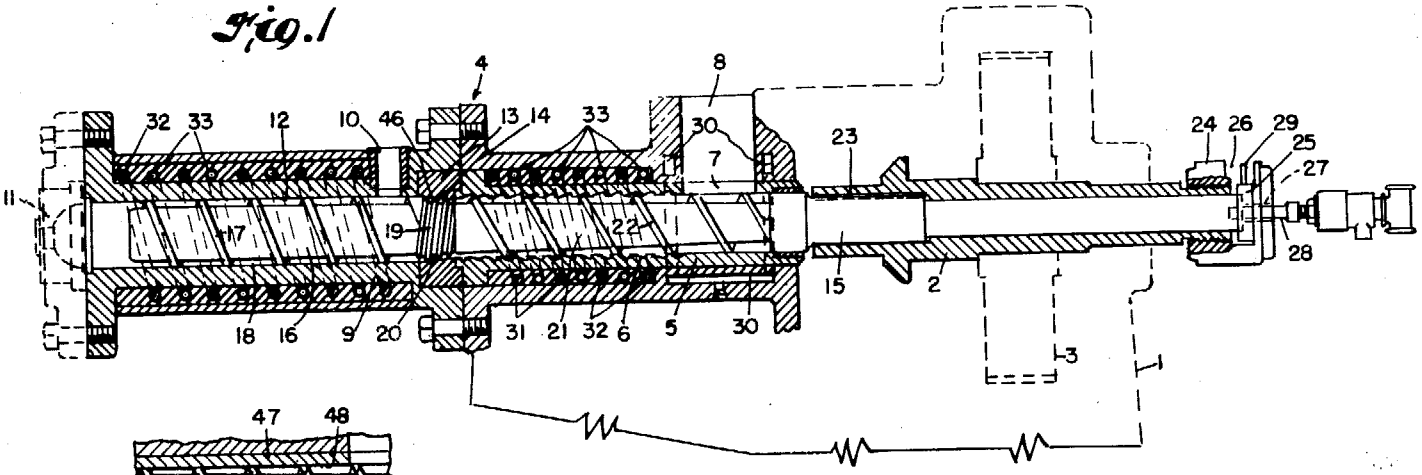
Fig. 1 is a cross-section view of one embodiment of this invention.

Referring now to the drawing and first to the form of the invention illustrated in Fig. 1, the extruder illustrated therein comprises a base 1 adapted to mount a suitable drive motor and speed reduction gearing therein (not shown). Journalled in said base and extending rearwardly therebeyond is a drive quill 2 which has a drive gear 3 keyed thereonto adapted to mesh with the motor drive gearing aforesaid.

Coaxial with said quill is a cylinder assembly 4 comprising for example a cylinder bushing 5 fixed within said base and which is preferably, though not necessarily, formed with an internally ribbed or threaded bore 6, the threads thereof preferably being inclined in the same general direction as the feeding ribs of the feed screw to be described hereafter. Said cylinder bushing 5 is formed with a lateral feed opening 7 adjacent its rear end which communicates with an opening 8 in said base, through which openings thermoplastic or like material in pellet, granular, powder or chip form is adapted to be introduced into said cylinder bushing.

Secured to said base and extending forwardly therefrom is a cylinder extension 9 coaxial with cylinder bushing 5. Said extension is provided with a vent 10 adjacent one end and has secured at the other end a suitable extrusion die 11. Said cylinder extension 9 is preferably formed with a smooth wall bore 12 therethrough.

Clamped between said cylinder bushing 5 and said cylinder extension 9 is a valve ring 13 which is formed with a tapered bore 14 therethrough smoothly joining the bores 6 and 12 of said bushing and extension.

Within said cylinder extension 9 and cylinder bushing 5 and extending through said quill 2 also rearwardly beyond said base 1 is a feed screw 15. Said feed screw is formed with an extension 16 in cylinder extension 9 which has a helical feeding rib 17 thereon, said extension being of slight taper as shown so as to be slightly larger at the die end thereof whereby to define an annular space 18 with bore 12 in said cylinder extension which may for certain materials gradually decrease in cross-sectional area in accordance with the reduction in the bulk of the material as it is advanced through said cylinder extension 9 by said feeding rib 17.

Adjacent the small end of said extension 16 is a tapered plug valve portion 19 disposed within the tapered bore 14 of said valve ring 13 and as will hereinafter appear said valve ring 13 and tapered plug portion 19 constitute a valve assembly which upon axial adjustment of feed screw 15 provides an adjustable annular orifice 20 to control the rate of flow of material through the apparatus. Said feed screw is further provided with a main body portion 21 disposed within cylinder bushing 5, said portion 21 likewise being provided with a helical feeding rib 22 thereon adapted to advance material forwardly from the lateral feed openings 7 and 8 toward die 11.

Said feed screw 15 is slidably keyed as at 23 to said quill 2 whereby driving of said quill through gear 3 will effect rotation of said feed screw.

Longitudinal adjustment of said feed screw 15 to vary the size of the annular orifice 20 between the tapered plug portion 19 and the tapered bore 14 in said valve ring 13 is effected in much the same manner as disclosed in the aforesaid Allen L. Heston patent, viz. by means of a nut 24 which is threaded onto the rear end portion of said quill 2 and which bears against the end of said screw through the intermediary of a thrust block 25 fitted into a slot 26 in said nut. The rear face of said block 25 bears against the rear wall of the slot 26 and the front face of which is shaped to embrace the rear end of said feed screw 15. Extending through an opening 27 in the end of said nut 24 is a conduit 28 which is threaded into said feed screw whereby the latter may be of hollow construction and a suitable coolant circulated therethrough to prevent excessive transmission of heat thereto such as would interfere with the feeding action. The thrust block 25 is provided with a handle 29 by which said block may be manipulated during assembly and disassembly of the machine. It is to be noted that the thrust of said feed screw 15 during operation of the machine is transmitted through said block to the quill, said quill being provided with suitable anti-friction thrust bearings (not shown) to withstand such force.

It is to be understood that suitable temperature control zones will be provided, as for example a cooling zone which herein is shown as comprising a chamber 30 disposed around the feed openings 7 and 8 through which a suitable temperature modifying medium is adapted to be circulated to prevent the material introduced into the cylinder bushing 5 from becoming "tacky" and sticking to said feed screw and with separate heating zones provided as by the electric heating units 31 and 32 which during the initial period of operation of the extruder, supply heat to the plasticized material disposed around said feed screw and which during later periods of operation after the apparatus has reached operating temperature are shut off. In addition to units 31 and 32 there may be provided passages 33 for circulation of temperature modifying medium to dissipate excess frictional heat which is generated by the working of the material by the screw. Said cylinder extension 9 and die 11 may be provided with similar temperature modifying devices, viz. units 32 and passages 33.

Having thus described one embodiment of the invention reference will now be made to the operation thereof.

Upon rotation of feed screw 15 and introduction of material in desired form through lateral feed openings 7 and 8, the action of the feeding rib 22 supplemented by the action of the ribs 6 in said cylinder bushing 5, if provided, will be to effect compressing of the material to increase its heat conductivity and to effect frictional heating, mixing, and smearing of the material, the material thus being worked or churned being at the same time advanced toward said cylinder extension 9. It has been discovered that for better results the necessary back pressure on the material should be built up in the very early stages of the process.

In order to obtain such back pressure build-up as well as to secure a screening or straining action, said feed screw 15 is adjusted longitudinally within cylinder extension 9 and cylinder bushing 5 by means of nut 24 so as to desirably adjust the annular orifice 20 between the tapered surfaces of the plug portion 19 and the tapered bore 14. The restriction to free flow provided at this point effects the necessary build-up of back pressure on the material in the cylinder bushing and because of the relative rotation of said feed screw 15 in said valve ring 13 there is effected a screening, homogenizing, and a final plasticization of the material by the smearing action of the closely spaced tapered surfaces.

Thereafter, the material now in a thoroughly plasticized and homogenized condition enters cylinder extension 9 but at a much reduced pressure whereby the volatile ingredients and trapped air and gas bubbles in the material are vented through the vent opening 10 from the very thin tubular stream of material which issues from the aforesaid annular orifice 20. Said thin stream of material fills the annular chamber 18 between said cylinder extension bore 12 and extension 16 and said feeding rib 17 on said extension advances the material toward die 11. Because of the relatively large cross-section of such annular chamber 18 and the relatively smaller pitch of the helical rib 17, the material is advanced rather slowly. As shown, the annular body of material thus advanced slowly and at desired pressure becomes slightly thinner toward die 11 in order to compensate for the reduction in the bulk thereof and thus maintains a uniform rate of flow. The plasticized material after flowing through this so-called "tempering"

zone finally enters and fills the chamber adjacent die 11 and then is extruded at a uniform pressure through said die.

Figure 2:
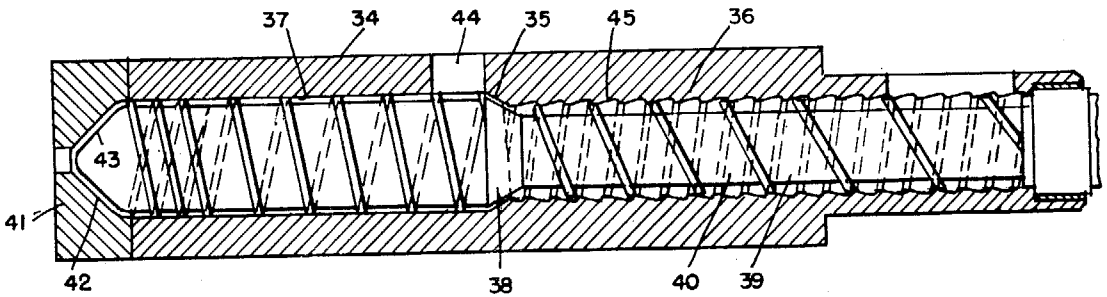
Fig. 2 is a cross-section view of a modification.

In the form of the invention illustrated in Fig. 2, the cylinder assembly 34 is of integral form and the tapered bore 35 between the temperature control zone 36 and tempering zone 37 cooperates with the tapered portion 38 of feed screw 39 to control the rate of flow of material therethrough and thus to control the back pressure build-up in the zone 36 and along the main portion 40 of said feed screw. A further difference in the Fig. 2 construction is that the die 41 and said feed screw 39 are provided with tapered bore and tapered extension portions 42 and 43 respectively which are spaced further apart than the tapered portions 35 and 38 which constitute the flow control valve so that the pressure build-up is in the zone 36 where desired rather than in the tempering zone 37 between the vent 44 and die 41.

With respect to the helical ribs 6 in the cylinder bushing 5 which as previously indicated may be included or not, as described, are preferably inclined in the same general direction as the feeding rib 22 of feed screw 15 whereby to induce a counterflow of the material which creates turbulence and thus facilitates more thorough blending or mixing and working of the material. Such counterflow, as indicated, improves the mixing and blending characteristics of the extruder so that the material as it emerges from the flow control valve orifice 20 is in a thoroughly plasticized and worked condition ready for tempering and elimination of bubbles by passage at low pressure through the cylinder extension 9. The modification illustrated in Fig. 2 may also be formed with an internally threaded or ribbed bore 45 to cooperate with the feed screw as just indicated.

As a further feature of this invention the tapered plug valve portion 19 in Fig. 1 or the corresponding portion 38 in Fig. 2 may, if desired, be provided with a helical rib 46 of opposite inclination to the feeding rib 22 on screw 15 (or the rib on screw 39 in Fig. 2). Such rib 46 creates additional mixing action at the control valve due to grinding or smearing action and counterflow action thereat to supplement or supplant similar action along the preceding portion of the screw.

Figure 3:
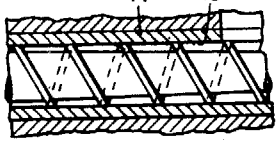
Fig. 3 is a fragmentary cross-section view of another modification.

In Fig. 3 is shown a modification in which the cylinder bushing 47 is formed with a smooth bore 48 therethrough as distinguished from the bushing 5 in Fig. 1 which has a threaded bore 6 therethrough. In such modification, that is the Fig. 3 modification, the counterflow action of the material may be entirely dispensed with when extruding certain materials or it may be found that by providing the ribs 46 on the valve portion sufficient counterflow action is obtained so as not to require the threaded or ribbed bore 6. In any event, it is within the contemplation of this invention to only provide feeding ribs on the feed screw without the counterflow action afforded by ribs 6 or 46.

Other modes of applying the principle of the invention may be employed, change being made as regards the details described, providing the features stated in any of the following claims, or the equivalent of such, be employed.

I therefore particularly point out and distinctly claim as my invention:

1. An extruder comprising a cylinder having a feed opening at one end for the introduction of material to be extruded from the other end thereof, a feed screw rotatable in said cylinder and adapted when rotated to advance and to condition the material for extrusion, and flow control means between the ends of said screw impeding free flow of material along said cylinder and screw and thereby building up a back pressure on the material in advance of said flow control means, said flow control means comprising opposed tapered surfaces on said screw and in said cylinder, said cylinder and said screw, in advance of said flow control means, being of smaller diameter than beyond said flow control means and such tapered surfaces joining the large and small diameter portions of said cylinder and screw respectively.

2. An extruder comprising a cylinder having a feed opening at one end for the introduction of material to be extruded from the other end thereof, a feed screw rotatable in said cylinder and adapted when rotated to advance and to condition the material for extrusion, and flow control means between the ends of said screw impeding free flow of material along said cylinder and screw and thereby building up a back pressure on the material in advance of said flow control means, said flow control means comprising opposed surfaces on said screw and in said cylinder which are movable toward and away from each other to vary the size of the passageway therebetween upon relative axial adjustment of said cylinder and screw, and means for adjusting said cylinder and screw axially with respect to each other.

3. An extruder comprising a cylinder which includes a feed opening at one end for the introduction of material to be extruded from the other end and successive zones along which the material is adapted to be advanced from such feed opening for plasticizing and working while under pressure in one zone and for conditioning for extrusion while under a substantially reduced pressure in the other zone, a feed screw extending through such successive zones and provided with a feeding rib for continuously advancing the material through such zones upon rotation of said screw, and a flow control means between such zones operative to maintain a back pressure on the material in such one zone and to pass the material at a lower pressure to such other zone, said flow control means comprising axially spaced and opposed surfaces on said feed screw and in said cylinder respectively, defining a passageway therebetween for flow of material from one zone to the other zone, said screw being mounted for axial adjustment in said cylinder whereby to vary the spacing between such opposed surfaces and thus to vary the size of the passageway, and means for locking said screw in desired axially adjusted position in said cylinder.

[4. An extruder comprising a cylinder having a feed opening at one end for the introduction of material to be extruded from the other end thereof, a feed screw rotatable in said cylinder and adapted when rotated to advance and to condition the material for extrusion, and flow control means between the ends of said screw impeding free flow of material along said cylinder and screw and thereby building up a back pressure on the material in advance of said flow control means, said flow control means comprising opposed surfaces on said screw and in said cylinder defining a passageway therebetween of cross-sectional area less than that between adjacent portions of said screw and cylinder, said feed screw being formed with a rib along its passageway defining surface inducing counterflow of material for intimate mixing and blending of the material prior to and during flow through said flow control means.]

5. An extruder comprising a cylinder having a feed opening at one end for the introduction of material to be extruded from the other end thereof, a feed screw rotatable in said cylinder and adapted when rotated to advance and to condition the material for extrusion, and flow control means between the ends of said screw impeding free flow of material along said cylinder and screw and thereby building up a back pressure on the material in advance of said flow control means, said flow control means comprising opposed tapered surfaces on said screw and in said cylinder.

[6. An extruder comprising a cylinder having a feed opening at one end for the introduction of material to be extruded from the other end thereof, a feed screw rotatable in said cylinder and adapted when rotated to advance and to condition the material for extrusion, flow control means in the intermediate portion of said extruder providing a passageway which impedes free flow of material and thereby builds up a back pressure on the material in advance of said flow control means, and means for varying the flow area of such passageway including passageway-defining surfaces relatively movable closer to and further from each other whereby the flow area of such passageway may be varied to predeterminedly impede free flow of material therethrough in accordance with the characteristics of the material being extruded.]

[7. An extruder according to claim 6 characterized further in that vent means are provided in the intermediate portion of said extruder following said flow control means for discharge of volatile ingredients and trapped gas bubbles in the material prior to extrusion of the material from the other end of said cylinder.]

8. An extruder according to claim 2 characterized further in that said cylinder in advance of said flow control means is formed with internal helical ribs inclined in a direction to induce counterflow of material in said cylinder and thereby to effect intimate blending of the material prior to advance thereof through said flow control means.

9. An extruder according to claim 2 characterized further in that a rib is formed on at least one of said opposed surfaces disposed to induce counterflow of material for intimate mixing and blending of the material prior to and during flow through said flow control means.

*10. An extruder comprising a cylinder, a feed screw rotatable in said cylinder, and flow control means in an intermediate portion of said extruder effective to impede free flow of the material being extruded along said cylinder and screw and thereby to build up a back pressure on the material in advance of said flow control means, said flow control means comprising axially spaced and relatively axially movable surfaces on said screw and in said cylinder defining a completely annular passageway of cross-sectional area less than that between adjacent portions of said screw and cylinder, said feed screw being formed with a rib along its annular passageway defining surface effective to induce counterflow of the material for intimate blending and mixing thereof prior to and during flow through said flow control means.*

*11. An extruder comprising a cylinder, a feed screw rotatable in said cylinder, flow control means in an intermediate portion of said extruder effective to impede free flow of the material being extruded along said cylinder and screw and thereby to build up a back pressure on the material in advance of said flow control means, said flow control means comprising complementary axially spaced annular portions on said screw and in said cylinder respectively defining a flow control passageway therebetween, and means for adjustably varying the axial spacing between said annular portions to thereby vary the flow area of such passageway so as to predeterminedly impede free flow of material in accordance with the characteristics thereof.*

References Cited in the file of this patent or the original patent

UNITED STATES PATENTS

| Number | Name | Date |
|---|---|---|
| 1,283,947 | Steinle | Nov. 5, 1918 |
| 1,935,050 | Gordon | Nov. 14, 1933 |
| 2,200,997 | Royle | May 14, 1940 |
| 2,449,652 | Heston | Sept. 21, 1948 |
| 2,496,625 | Henning | Feb. 7, 1950 |
| 2,519,014 | Bankey | Aug. 15, 1950 |
| 2,615,199 | Fuller | Oct. 28, 1952 |